(12) United States Patent
Lu et al.

(10) Patent No.: US 11,243,608 B2
(45) Date of Patent: Feb. 8, 2022

(54) CONTROL METHOD FOR HEAD-MOUNTED VISUAL APPARATUS, HEAD-MOUNTED VISUAL APPARATUS AND COMPUTER READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yuanjie Lu, Beijing (CN); Xi Li, Beijing (CN); Hao Zhang, Beijing (CN); Lili Chen, Beijing (CN); Peng Han, Beijing (CN); Yu Lei, Beijing (CN); Huidong He, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/751,226

(22) Filed: Jan. 24, 2020

(65) Prior Publication Data
US 2020/0241636 A1    Jul. 30, 2020

(30) Foreign Application Priority Data
Jan. 28, 2019  (CN) .......................... 201910082379.8

(51) Int. Cl.
*G06F 3/01*  (2006.01)
*G06T 19/00*  (2011.01)
(52) U.S. Cl.
CPC ............ *G06F 3/013* (2013.01); *G06T 19/006* (2013.01)

(58) Field of Classification Search
None
See application file for complete search history.

(56) References Cited

U.S. PATENT DOCUMENTS

2004/0141217 A1  7/2004  Endo et al.
2018/0260624 A1*  9/2018  Xiao ........................ G06F 3/013
(Continued)

FOREIGN PATENT DOCUMENTS

CN  105445188  3/2016
CN  206906702  1/2018
(Continued)

OTHER PUBLICATIONS

Office action from Chinese Application No. 201910082379.8 dated Aug. 18, 2020.

*Primary Examiner* — Ifedayo B Iluyomade
(74) *Attorney, Agent, or Firm* — Calfee, Halter & Griswold LLP

(57) ABSTRACT

A control method for a head-mounted visual apparatus, a corresponding computing apparatus, a head-mounted visual apparatus and a computer-readable storage medium. The head-mounted visual apparatus has an infrared transceiver including an infrared light source array and an infrared detector. The control method comprises the steps of: driving each sub-light source to emit coherent infrared light to form an interference enhanced scanning light spot on a face of a user who wears the head-mounted visual apparatus; controlling each phase of the coherent infrared light emitted by each sub-light source respectively to make the scanning light spot move in the local area, including eyes, of the face of the user, to realize a scanning of the local area; and using the infrared detector to receive the infrared light reflected from the local area to generate scanning data.

20 Claims, 7 Drawing Sheets

(56) References Cited

U.S. PATENT DOCUMENTS

| | | | |
|---|---|---|---|
| 2020/0074651 A1* | 3/2020 | Zhang | G02B 27/0179 |
| 2020/0192152 A1* | 6/2020 | Jamali | G02F 1/133526 |
| 2021/0019493 A1* | 1/2021 | Yokoyama | A61B 3/14 |

FOREIGN PATENT DOCUMENTS

| | | | | |
|---|---|---|---|---|
| CN | 108616703 | | 10/2018 | |
| JP | WO 2019187808 | * | 3/2018 | ............ A61B 3/113 |
| WO | 2017139871 | | 8/2017 | |

* cited by examiner

CONTROL METHOD FOR HEAD-MOUNTED VISUAL APPARATUS, HEAD-MOUNTED VISUAL APPARATUS AND COMPUTER READABLE STORAGE MEDIUM

RELATED APPLICATIONS

The present application claims the benefit of Chinese Patent Application No. 201910082379.8, filed on Jan. 28, 2019 with the China National Intellectual Property Administration, the entire disclosure of which is incorporated herein by reference.

TECHNICAL FIELD

The present disclosure relates to the field of head-mounted visual apparatus technology, and particularly to a control method for and a computing apparatus of a head-mounted visual apparatus, a head-mounted is visual apparatus, and a computer-readable storage medium.

BACKGROUND

A head-mounted visual apparatus comprises an apparatus which a user can wear on his/her head and observe through optical devices such as lenses included therein. In recent years, with the development of virtual reality (VR), augmented reality (AR) and three-dimensional display technology, head-mounted visual apparatuses have been widely used.

Because the optical devices in the head-mounted visual apparatus are very close to the user's eyes, if the optical centers of the optical devices in the head-mounted visual apparatus are not aligned with the pupil centers of the user's eyes, the condition will easily lead to visual fatigue and even physical discomfort. Therefore, the head-mounted visual apparatus needs to determine the positions of the pupil centers of the user's eyes, and make adjustments accordingly to enhance the user's comfort and immersion.

SUMMARY

According to some exemplary embodiments, there is provided a control method for a head-mounted visual apparatus, wherein the head-mounted visual apparatus comprises an infrared transceiver, the infrared transceiver comprises an infrared light source array and an infrared detector, the infrared light source array comprises a plurality of sub-light sources, each of the plurality of sub-light sources is configured to emit coherent infrared light, and the control method comprises steps of: driving each sub-light source to emit coherent infrared light to form an interference enhanced scanning light spot on a face of a user who wears the head-mounted visual apparatus; controlling each phase of the coherent infrared light emitted by each sub-light source respectively to make the scanning light spot move in a local area, including the eyes, of the face of the user, thereby realizing a scanning of the local area; and using the infrared detector to receive the infrared light reflected from the local area to generate scanning data.

In some exemplary embodiments, the control method further comprises a step of: determining positions of the pupil centers of the user's eyes based on the scanning data.

In some exemplary embodiments, the step of determining the positions of the pupil centers of the user's eyes based on the scanning data comprises: generating a three-dimensional image of the local area based on the scanning data; comparing the three-dimensional image with facial features to determine the positions of the eyes; and determining the positions of the pupil centers based on the positions of the eyes.

In some exemplary embodiments, the infrared detector comprises a detector array composed of a plurality of sub-detectors, the scanning data records a distribution on the detector array of the infrared light reflected from the local area, and the step of generating a three-dimensional image of the local area based on the scanning data comprises: obtaining depth information of each part of the local area based on the distribution; and generating the three-dimensional image based on the depth information of each part of the local area.

In some exemplary embodiments, the step of comparing the three-dimensional image with facial features to determine the positions of the eyes comprises: identifying graphic features of eye corners in the three-dimensional image; and determining the positions of the eyes based on the identified graphic features of the eye corners.

In some exemplary embodiments, the step of determining positions of the pupil centers of the user's eyes based on the scanning data comprises: determining an infrared light reflection intensity of each part of the local area based on the scanning data; and determining the positions of the pupil centers based on the infrared light reflection intensity of each part of the local area.

In some exemplary embodiments, the head-mounted visual apparatus further comprises a first lens device and a second lens device configured to correspond to the user's eyes so that the user may watch via the first lens device and the second lens device, and the head-mounted visual apparatus further comprises an adjustment device configured to adjust positions of the first lens device and the second lens device, and the control method further comprises a step of: adjusting a position of at least one of the first lens device and the second lens device by the adjustment device based on the positions of the pupil centers, so that the optical centers of the first lens device and the second lens device are respectively aligned with the corresponding pupil centers.

In some exemplary embodiments, the control method further comprises: adjusting a distance from an optical center of at least one of the first lens device and the second lens device to one of the pupil centers correspondingly.

In some exemplary embodiments, the head-mounted visual apparatus further comprises a first display screen and a second display screen, the adjustment device is further configured to adjust positions of displaying areas in the first display screen and the second display screen, and the control method further comprises: adjusting a position of a displaying area in at least one of the first display screen and the second display screen by the adjustment device, so that the center of the displaying area in the first display screen is aligned with the optical center of the first lens device, and the center of the displaying area in the second display screen is aligned with the optical center of the second lens device.

In some exemplary embodiments, the control method further comprises: adjusting a distance from the center of the displaying area in at least one of the first display screen and the second display screen to the optical center of one of the first lens device and the second lens device correspondingly.

According to some exemplary embodiments, there is also provided a head-mounted visual apparatus comprising an infrared transceiver comprising an infrared light source array and an infrared detector, wherein the infrared light source array comprises a plurality of sub-light sources, each of the plurality of sub-light sources is configured to emit coherent infrared light; a memory configured to store a a series of software instructions, referred to hereinafter as a "computer program,"; and a processor configured to execute the computer program to realize a control method for the head-mounted visual apparatus, the control method comprises steps of: driving each sub-light source to emit coherent infrared light to form an interference enhanced scanning light spot on a face of a user who wears the head-mounted visual apparatus; controlling each phase of the coherent infrared light emitted by each sub-light source respectively to make the scanning light spot move in a local area, including eyes, of the face of the user, thereby realizing a scanning of the local area; and using the infrared detector to receive the infrared light reflected from the local area to generate scanning data.

In some exemplary embodiments, the control method realized by executing the computer program by the processor of the head-mounted visual apparatus further comprises a step of: determining the positions of the pupil centers of the user's eyes based on the scanning data.

In some exemplary embodiments, the step of determining the positions of the pupil centers of the user's eyes based on the scanning data in the control method realized by executing the computer program by the processor of the head-mounted visual apparatus comprises: generating a three-dimensional image of the local area based on the scanning data; comparing the three-dimensional image with facial features to determine the positions of the eyes; and determining the positions of the pupil centers based on the positions of the eyes.

In some exemplary embodiments, the infrared detector of the head-mounted visual apparatus comprises a detector array composed of a plurality of sub-detectors, the scanning data records a distribution on the detector array of the infrared light reflected from the local area, and wherein the step of generating a three-dimensional image of the local area based on the scanning data in the control method realized by executing the computer program by the processor of the head-mounted visual apparatus comprises: obtaining depth information of each part of the local area based on the distribution; and generating the three-dimensional image based on the depth information of each part of the local area.

In some exemplary embodiments, the step of comparing the three-dimensional image with facial features to determine the positions of the eyes in the control method realized by executing the computer program by the processor of the head-mounted visual apparatus comprises: identifying graphic features of eye corners in the three-dimensional image; and determining the positions of the eyes based on the identified graphic features of the eye corners.

In some exemplary embodiments, the step of determining positions of the pupil centers of the user's eyes based on the scanning data in the control method realized by executing the computer program by the processor of the head-mounted visual apparatus comprises: determining an infrared light reflection intensity of each part of the local area based on the scanning data; and determining the positions of the pupil centers based on the infrared light reflection intensity of each part of the local area.

In some exemplary embodiments, the head-mounted visual apparatus further comprises a first lens device and a second lens device configured to correspond to the user's eyes so that the user may watch via the first lens device and the second lens device, and the head-mounted visual apparatus further comprises an adjustment device configured to adjust positions of the first lens device and the second lens device, and the control method realized by executing the computer program by the processor of the head-mounted visual apparatus further comprises a step of: adjusting a position of at least one of the first lens device and the second lens device by the adjustment device based on the positions of the pupil centers, so that the optical centers of the first lens device and the second lens device are respectively aligned with the corresponding pupil centers.

In some exemplary embodiments, the head-mounted visual apparatus further comprises a first display screen and a second display screen, the adjustment device is further configured to adjust the positions of displaying areas in the first display screen and the second display screen, and the control method realized by executing the computer program by the processor of the head-mounted visual apparatus further comprises: adjusting a position of a displaying area in at least one of the first display screen and the second display screen by the adjustment device, so that the center of the displaying area in the first display screen is aligned with the optical center of the first lens device, and the center of the displaying area in the second display screen is aligned with the optical center of the second lens device.

In some exemplary embodiments, the control method realized by executing the computer program by the processor of the head-mounted visual apparatus further comprises: adjusting a distance from the center of the displaying area in at least one of the first display screen and the second display screen to the optical center of one of the first lens device and the second lens device correspondingly.

According to some exemplary embodiments, there is provided a computer-readable storage medium, in which a computer program is stored, and when the computer program is executed, a control method for a head-mounted visual apparatus is realized, wherein the head-mounted visual apparatus comprises an infrared transceiver, the infrared transceiver comprises an infrared light source array and an infrared detector, the infrared light source array comprises a plurality of sub-light sources, each of the plurality of sub-light sources is configured to emit coherent infrared light, and the control method comprises steps of: driving each sub-light source to emit coherent infrared light to form an interference enhanced scanning light spot on a face of a user who wears the head-mounted visual apparatus; controlling each phase of the coherent infrared light emitted by each sub-light source respectively to make the scanning light spot move in the local area, including eyes, of the face of the user, thereby realizing a scanning of the local area; and using the infrared detector to receive the infrared light reflected from the local area to generate scanning data.

BRIEF DESCRIPTION OF DRAWINGS

To explain the technical solutions of the exemplary embodiments more clearly, the exemplary embodiments will be described with reference to the drawings. In the drawings.

Figure 1:
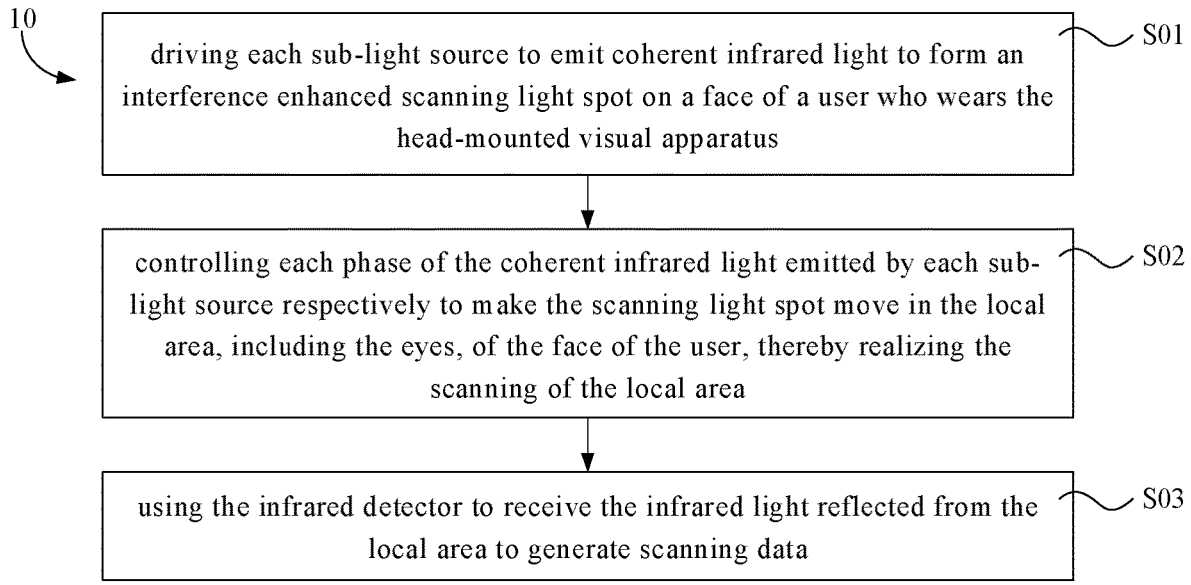
FIG. 1 schematically shows a control method for a head-mounted visual apparatus provided by some exemplary embodiments in the form of a flowchart.

It shall be understood that the drawings in the present disclosure are merely used to illustrate the principle of the technical solutions of the exemplary embodiments, so the drawings are not necessarily drawn to scale. Moreover, identical elements, components or parts are indicated by the same reference numerals throughout the drawings.

DETAILED DESCRIPTION

The technical solutions in exemplary embodiments will be described clearly and completely in connection with the drawings. It shall be noted that the described exemplary embodiments are only part of the embodiments, and not all of the embodiments. Based on the exemplary embodiments, all other embodiments obtained by those of ordinary skills in the art under the premise of not paying out creative work pertain to the protection scope of the present disclosure.

In the following, the terms such as "first" and "second" can be used for descriptive purposes only, rather than be understood as disclosing or implying relative importance, or implicitly indicating the number of technical features referred to. Thus, a feature defined by "first" or "second" may explicitly or implicitly include one or more such features. In addition, it should be noted that these terms are only used to distinguish one element, component or part from another. Therefore, the first element, component or part discussed below may also be referred to as the second or third element, component or part without departing from the teachings of the present disclosure. As used herein, the singular forms of "a", "an" and "the" are also intended to include the plural forms, unless otherwise specified clearly in the context. Furthermore, in the description of the exemplary embodiments, unless otherwise specified, "multiple" means two or more.

It shall be noted that, unless otherwise defined, all terms (including technical terms and scientific terms) used in the exemplary embodiments have the same meaning as commonly understood by one having ordinary skills in the art. It should also be understood that terms such as those defined in a common dictionary should be construed as having the same meaning as in the context of the related art, and will not be construed in an ideal or overly formal sense, unless defined explicitly as such herein.

It shall be understood that the terms such as "comprise" and/or "include" used in the specification and claims of the present disclosure indicate that the features, entireties, steps, operations, elements and/or components appearing before said terms cover the features, entireties, steps, operations, elements and/or components enumerated thereafter, but do not exclude the presence of one or more other features, entireties, steps, operations, elements, components and/or groups thereof. Moreover, the term "and/or" used herein comprises any and all combinations of one or more related items as listed.

The steps involved in the method described in the present disclosure are exemplary, and are not necessarily to be implemented in the order as listed. Instead, one or more of these steps may be implemented in a different order or simultaneously according to actual situations. Furthermore, the described method may also comprise other additional steps according to actual situations.

In addition, in the description of the present disclosure, the locality or position relationships indicated by the terms of locality, such as "center", "up", "down", "front", "back", "left", "right", "vertical", "horizontal", "top", "bottom", "inner" and "outer", are those shown on the basis of the drawings, are only used to facilitate the description of the exemplary embodiments, rather than indicate that the described devices or elements must have a specific orientation, or be configured and operated in a specific orientation, and therefore cannot be understood as a limitation to the present disclosure. Therefore, it should be understood that when in actual use, the description of locality in the present disclosure should be changed accordingly due to the change of locality.

It should also be explained that, in the description of the specification of the present application, expressions such as "an embodiment", "some embodiments", "exemplary embodiments", "specific examples" or "some examples" are intended to mean that specific features, structures, materials or characteristics described with reference to the embodiments or examples are contained in at least one embodiment or example of this disclosure. Therefore, schematic descriptions with respect to the above expressions herein do not have to be only directed at the same embodiments or examples herein. Instead, specific features, structures, materials or characteristics described thereby can be combined in a suitable manner in any one or more embodiments or examples. Besides, where no contradiction is caused, those skilled in the art can combine and assemble different embodiments or examples described in the specification and features of the different embodiments or examples.

Some techniques, structures and materials commonly known in the art of this disclosure are not described in detail for the sake of clarity so as to avoid making the present application tediously long.

As mentioned above, the optical center of the optical device (such as the lens device) may not be aligned with the pupil center of the user's eye due to various factors during the use of the head-mounted visual apparatus. For example, when different users wear the same head-mounted visual apparatus, because different users' eyes may have different pupil distances, the optical centers of the optical devices in the head-mounted visual apparatus may not be aligned with the pupil centers of the user's eyes. In addition, if the same user wears the head-mounted visual apparatus improperly, the optical centers of the optical devices in the head-mounted visual apparatus may also not be aligned with the pupil centers of the user's eyes. Because the optical devices in the head-mounted visual apparatus are very close to the user's eyes, if the optical centers of the optical devices in the head-mounted visual apparatus are not aligned with the pupil centers of the user's eyes, it will easily lead to visual fatigue and even physical discomfort. In addition, known head-mounted visual apparatus with mechanical scanning devices have a complicated structure, such that the response time is long.

Therefore, for a head-mounted visual apparatus, it is desired to provide a simple and convenient scanning method, so as to scan the local area of the user's face covered by the head-mounted visual apparatus to facilitate the determination of the positions of the pupil centers of the user's eyes, and make corresponding adjustment based on the determined positions of the pupil centers.

FIG. 1 schematically shows a control method for a head-mounted visual apparatus provided by some exemplary embodiments in the form of a flowchart, wherein the head-mounted visual apparatus comprises an infrared transceiver, the infrared transceiver comprises an infrared light source array and an infrared detector, the infrared light source array may comprise a plurality of sub-light sources arranged in an array form, and each sub-light source may emit coherent infrared light. As shown in FIG. 1, the control method 10 for the head-mounted visual apparatus may comprise the following steps of:

S01: driving each sub-light source to emit coherent infrared light to form an interference enhanced scanning light spot on a face of a user who wears the head-mounted visual apparatus;

S02: controlling each phase of the coherent infrared light emitted by each sub-light source respectively to make the scanning light spot move in a local area, including eyes, of the face of the user, thereby realizing a scanning of the local area; and S03: using the infrared detector to receive the infrared light reflected from the local area to generate scanning data.

As stated above, in the step S01, each sub-light source of the infrared light source array is driven to emit coherent infrared light, so that the coherent infrared light emitted by sub-light sources can interfere to superpose in space, thereby forming light intensity enhanced and weakened areas in space.

Take an interference of two light beams as an example. When two linearly polarized light beams with the same vibration direction interfere in space, the light intensity at a point r in space can be determined by the following formula:

$$I(r)=I_1+I_2+2*\text{square}(I_1*I_2)\cos(\theta_1-\theta_2),$$

wherein I(r) is the light intensity at the point r in the space after the superposition of two light beams, $I_1$ and $I_2$ are the light intensities of two light beams (i.e., the first light beam and the second light beam), and $\theta_1$ and $\theta_2$ are the phases of two light beams respectively. It can be seen from the above formula that when $I_1$ and $I_2$ are kept constant, whether the light is intensity at the point r is enhanced or weakened is determined by the phase difference between the two light beams.

The multi-light-beam interference may have an improved effect. Multi-light-beam interference refers to the existence of multiple coherent light beams in space, which are, e.g., the first, second, . . . , and n-th coherent light beams. It is easy to understand that the light intensity at a point r in the space in the case of interference of three coherent light beams can be obtained by superposing the third light beam with the light intensity of the synthesized light after the superposition of two light beams, and for more coherent light beams, it can be analogized as follows:

$$I_a(r)=I_1I_2+2*\text{square}(I_1*I_2)\cos(\theta_1-\theta_2),$$

$$I_b(r)=I_3+I_a+2*\text{square}(I_3*I_a)\cos(\theta_3-\theta_a),$$

$$I_c(r)=L+I_b+2*\text{square}(I_4*I_b)\cos(\theta_4-\theta_b),$$

. . .

$$I_x(r)=I_n+I_{(x-1)}+2*\text{square}(I_n*I_{(x-1)})\cos(\theta_n-\theta_{(x-1)}),$$

wherein $I_1, I_2, \ldots, I_n$ are the light intensities of the first, second, . . . , n-th coherent light beams respectively, $I_a$ is the light intensity of the first synthetic light synthesized by the first and second coherent light beams, and $\theta_a$ is the phase of the first synthetic light synthesized by the first and second coherent light beams; similarly, $I_b$ is the light intensity of the second synthetic light synthesized by the first synthetic light and the third coherent light beam, and $\theta_b$ is the phase of the second synthetic light synthesized by the first synthetic light and the third coherent light beam, and so on. It can be seen that $I_x(r)$ is the comprehensive light intensity at a point r in the space after the superposition of n coherent light beams. Therefore, the superposition of multiple interfered coherent light beams to may make the light intensity in most areas of space approximately zero after the superposition, and the light intensity in specific areas will be enhanced so as to realize the illumination of specific areas.

Therefore, by driving each sub-light source to emit coherent infrared light, and making multiple coherent infrared light beams interfere, is exemplary embodiments can realize the illumination of a small specific area in the local area of the face of the user who wears the head-mounted visual apparatus, that is to say, an interference enhanced scanning light spot can be generated in the local area.

Figure 2:
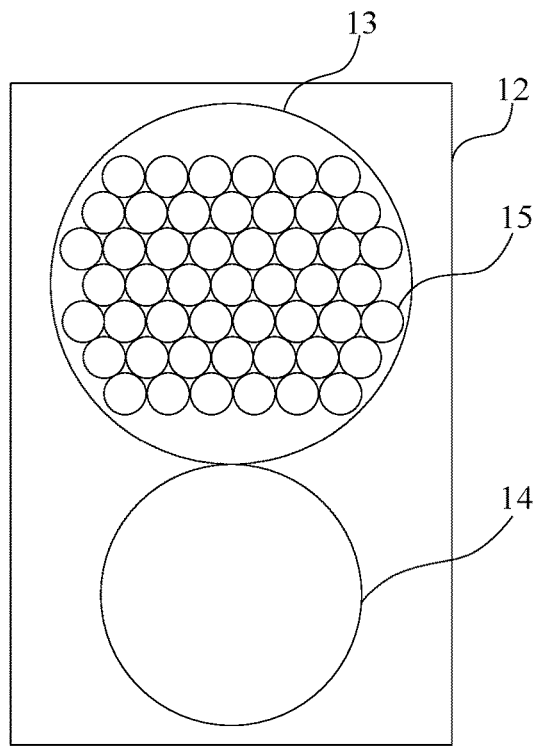
FIG. 2 schematically shows an infrared transceiver in the head-mounted visual apparatus provided by some exemplary embodiments.

FIG. 2 schematically shows an infrared transceiver for use in the head-mounted visual apparatus. As shown in FIG. 2, the infrared transceiver 12 may comprise an infrared light source array 13 and an infrared detector 14. The infrared light source array 13 may comprise a plurality of sub-light sources 15 arranged in an array form, each sub-light source 15 being able to emit coherent infrared light. The infrared detector 14 is a sensor capable of detecting infrared light. In addition, in another exemplary embodiment of the present disclosure, the infrared detector 14 may also comprise a plurality of sub-detectors arranged in an array form, so that the infrared detector 14 forms a detector array, which will be described in detail below.

With further reference to FIGS. 1 and 2, the illumination of different specific areas in the local area of the user's face can be realized by controlling each phase of the coherent infrared light emitted by each sub-light source 15 respectively. As mentioned above, the superposition of multiple coherent light beams emitted by multiple sub-light sources 15 can make the light intensity of most areas in the space approximately zero after superposition, while the light intensity in specific areas will be enhanced so as to realize the illumination of specific areas. Furthermore, by controlling or changing the phase of each infrared coherent light, it is possible to change the illuminated specific areas, that is, to make the scanning light spot move in the local area, thereby realizing the scanning to of the local area.

As a non-limiting example, a scanning method for the infrared light source array 21 will be introduced briefly:

a two-dimensional rectangular reference coordinate system may be established in the field of vision of the infrared detector 14, for example, is by taking the upper left corner as the origin (0, 0), and positioning the positive directions of the x-axis and the y-axis respectively rightwards and downwards. By controlling the phase of the coherent infrared light emitted by each sub-light source 15, the scanning light spot may scan the local area, including the eyes, of the user's face according to the two-dimensional rectangular reference coordinate system defined by the x-axis and the y-axis. As a non-limiting example, for example, it is possible to start scanning along the x-axis from the origin (0, 0), scan whole lines sequentially: from (0, 0) to (0, m), and then scan following whole lines (1, 0) to (1, m), (2, 0) to (2, m), . . . , where m represents the number of scanning points in each line, and the scanning of the local area of the face can be completed by analogy. It is easy to understand that any other suitable scanning method is feasible, and the present disclosure does not particularly define the specific method for scanning the local area of the user's face.

In step S03, the control method 10 uses the infrared detector 14 to receive the infrared light reflected from the local area to generate the scanning data. According to different measurement methods and measurement parameters, scanning data can record different measurement results. As a non-limiting example, when a three-dimensional image of the local area of the face is generated to compare with facial features, the depth information of each part of the local area can be recorded by the scanning data; and when positions of the pupil centers of the user's eyes are determined based on the change of infrared reflection intensity, the infrared light reflection intensity of each part of the local area can be recorded by the scanning data may record, which will be described in detail below.

Figure 3:
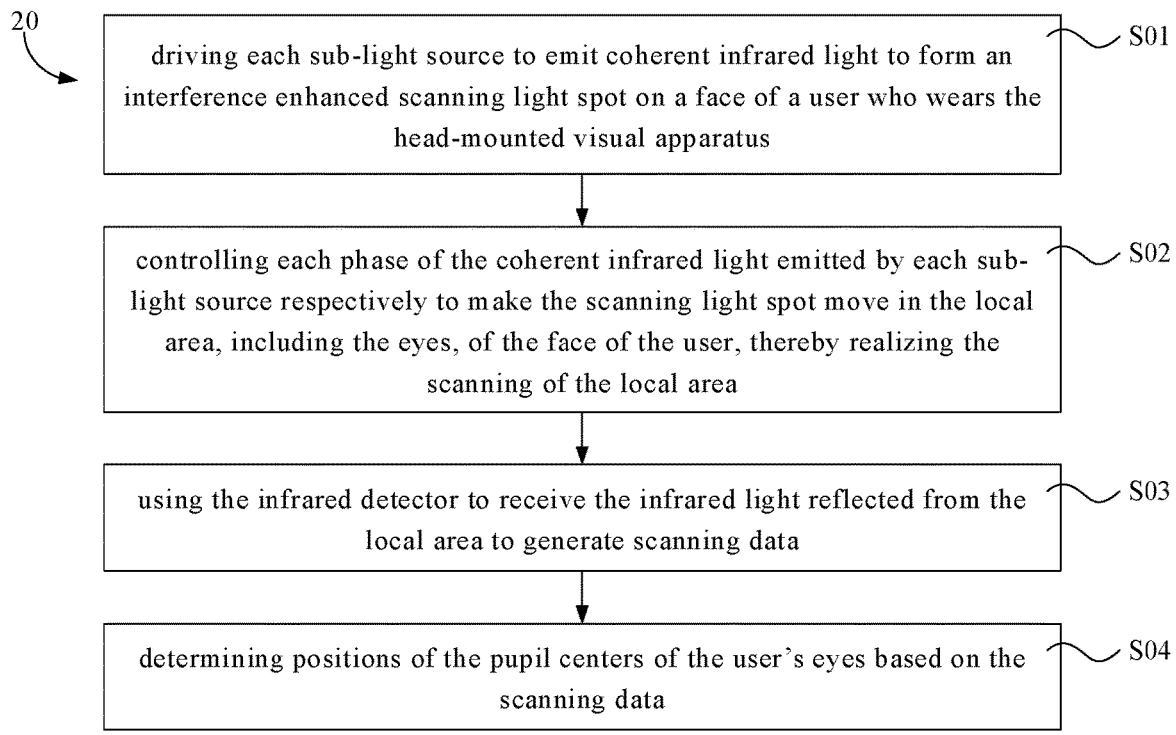
FIG. 3 schematically shows another control method for a head-mounted visual apparatus provided by some exemplary embodiments in the form of a flowchart.

FIG. 3 schematically shows another control method for a head-mounted visual apparatus provided by some exemplary embodiments of the present disclosure in the form of a flowchart. In comparison with the control method 10 for a head-mounted visual apparatus as shown in FIG. 1, the control method 20 for a head-mounted visual apparatus as shown in FIG. 3 is different because it further comprises the step S04, i.e., determining the positions of the pupil centers of the user's eyes based on the scanning data. According to different measurement methods and measurement parameters, the scanning data may record different measurement results. Thus, in the step S04, the control method 20 may determine the positions of the pupil centers of the user's eyes in different ways.

Figure 4:
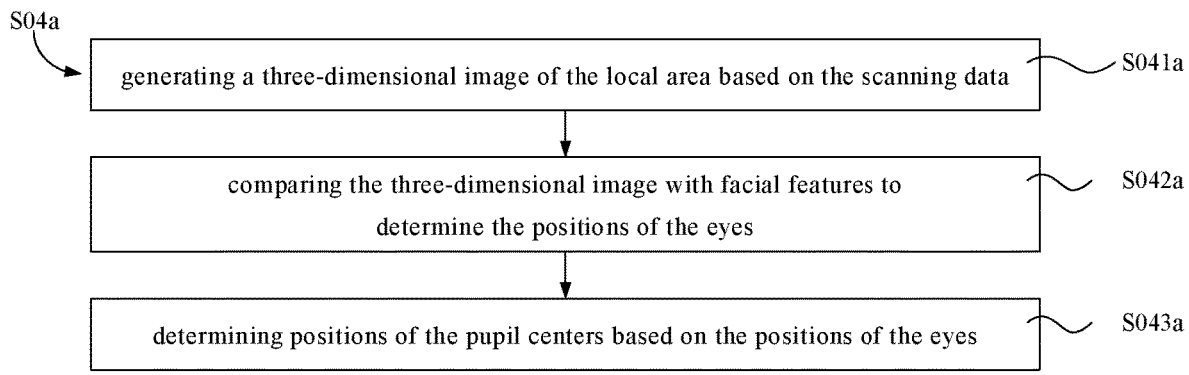
FIG. 4 schematically shows an example of determining the positions of the pupil centers of the user's eyes based on the scanning data in the control method as shown in FIG. 3.

FIG. 4 shows an exemplary way of determining the positions of the pupil centers of the user's eyes based on the scanning data in the control method 20 as shown in FIG. 3. As shown in FIG. 4, the way S04a of determining the positions of the pupil centers of the user's eyes in the control method 20 comprises the following steps of:

S041a: generating a three-dimensional image of the local area based on the scanning data;

S042a: comparing the three-dimensional image with facial features to determine the positions of the eyes; and S043a: determining the positions of the pupil centers based on the positions of the eyes.

It is easy to understand that in the step S041a, any suitable method may be used to determine the distance between each point in the local area and the infrared detector 14, including but not limited to the phase ranging method, the trigonometric ranging method, etc., so that the depth information of each point in the local area (i.e., the change of the distance between each part of the local area and a reference plane of the head-mounted visual apparatus, e.g., the plane where the infrared detector 14 is located (which is substantially parallel to the user's face)) may be obtained. In an exemplary embodiment using the trigonometric ranging method, the infrared detector 14 may comprise a plurality of sub-detectors that form a detector array. Depending on the distance between each part of the local area of the user's face and, e.g., the infrared detector 14, the infrared light reflected back to the infrared detector 14 will be distributed is on different sub-detectors of the detector array. Therefore, according to the distribution of the reflected infrared light on the detector array, the depth information of each point of the local area can be determined. The scanning data obtained in the step S03 according to the control method of the exemplary embodiment of the present disclosure may record the scanning coordinates of each point in the local area and the corresponding depth information of each point. Therefore, in the step S041a, the scanning data can be used to generate a three-dimensional image of the local area. In the step S042a, the positions of the eyes may be determined based on the comparison with any suitable facial features of human beings. As a non-limiting example, it is possible to identify the graphical features of the eye corners (including the inner and outer eye corners) in the three-dimensional image of the local area, and determine the positions of the user's eyes based on the identified graphical features of the eye corners. In the step S043a, the positions of the pupil centers of the eyes can be determined based on the determined positions of the user's eyes. As a non-limiting example, after identifying the graphical features of the eye corners, the middle position between the two corresponding eye corners (i.e., the inner and outer eye corners) can be determined as the position of the pupil center.

Figure 5:
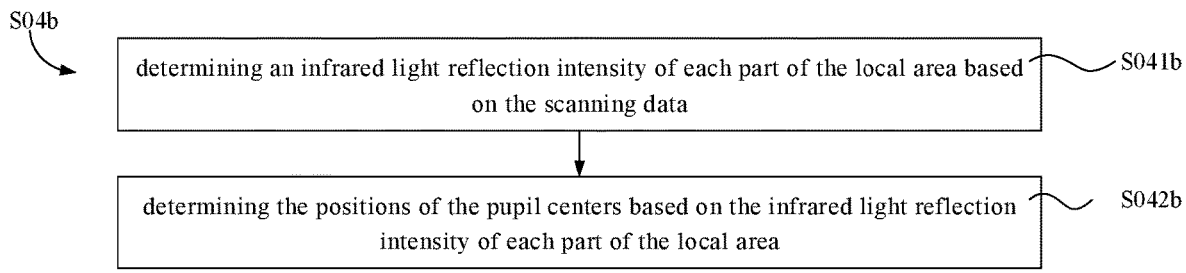
FIG. 5 schematically shows another example of determining the positions of the pupil centers of the user's eyes based on the scanning data in the control method as shown in FIG. 3.

FIG. 5 shows another exemplary way of determining the positions of the pupil centers of the user's eyes based on the scanning data in the control method 20 as shown in FIG. 3. As shown in FIG. 5, the way S04b of determining the positions of the pupil centers of the user's eyes in the control method 20 may comprise the following steps of:

S041b: determining an infrared light reflection intensity of each part of the local area based on the scanning data; and S042b: determining the positions of the pupil centers based on the infrared light reflection intensity of each part of the local area.

The way S04b as shown in FIG. 5 is based on the following principle, i.e., the skin of the human face, the cornea of the eye and the pupil of the is eye have different reflectivity to the infrared light. Therefore, when the infrared light with certain intensity is used to scan the local area, including the eyes, of the user's face, the infrared detector 14 will obtain different infrared reflection intensities of various parts of the local area. Therefore, the positions of the pupil centers of the user's eyes may also be determined by analyzing the distribution of different infrared light reflection intensities from various scanned parts of the local area.

Figure 6:
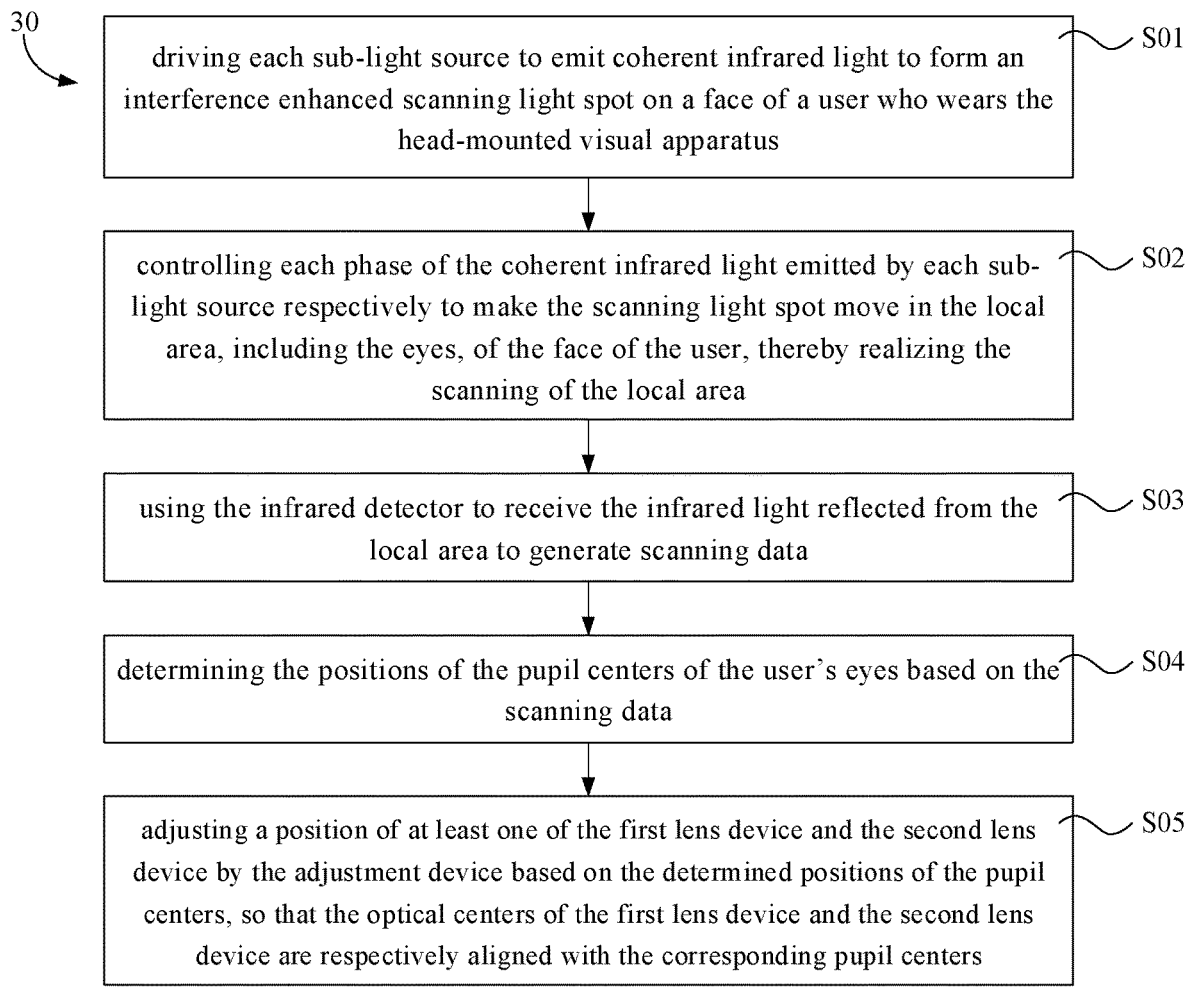
FIG. 6 schematically shows yet another control method for a head-mounted visual apparatus provided by some exemplary embodiments in the form of a flowchart.

FIG. 6 schematically shows yet another control method for a head-mounted visual apparatus provided by some exemplary embodiments in the form of a flowchart, wherein the head-mounted visual apparatus further comprises a first lens device and a second lens device so that the user who wears the head-mounted visual apparatus may conduct visual observation via the first lens device and the second lens device. It shall be understood that the lens device mentioned in the present disclosure may be a single lens, or an assembly comprising a plurality of lenses and/or other suitable optical elements, which will not be particularly specified herein. In addition, the head-mounted visual apparatus may also comprise an adjustment device configured to adjust the positions of the first lens device and the second lens device.

In comparison with the control method 20 for the head-mounted visual apparatus as shown in FIG. 3, the control method 30 for the head-mounted visual apparatus as shown in FIG. 6 is different because it further comprises the step S05, i.e., adjusting a position of at least one of the first lens device and the second lens device by the adjustment device based on the determined positions of the pupil centers, so that the optical centers of the first lens device and the second lens device are respectively aligned with the corresponding pupil centers. As a non-limiting example, the distance between the optical centers of the first lens device and the second lens device can be adjusted to be equal to the pupil distance determined between the pupil centers of the user's eyes.

In the process of adjusting the optical center of the lens device to is align with the corresponding pupil center, the distance (i.e., image distance) between the optical center of the lens device and the corresponding pupil center may vary. Therefore, the control method 30 may also, as required, comprise the step of adjusting the image distance to ensure that the observed object may be clearly imaged in the user's eye via the lens device.

Figure 7:
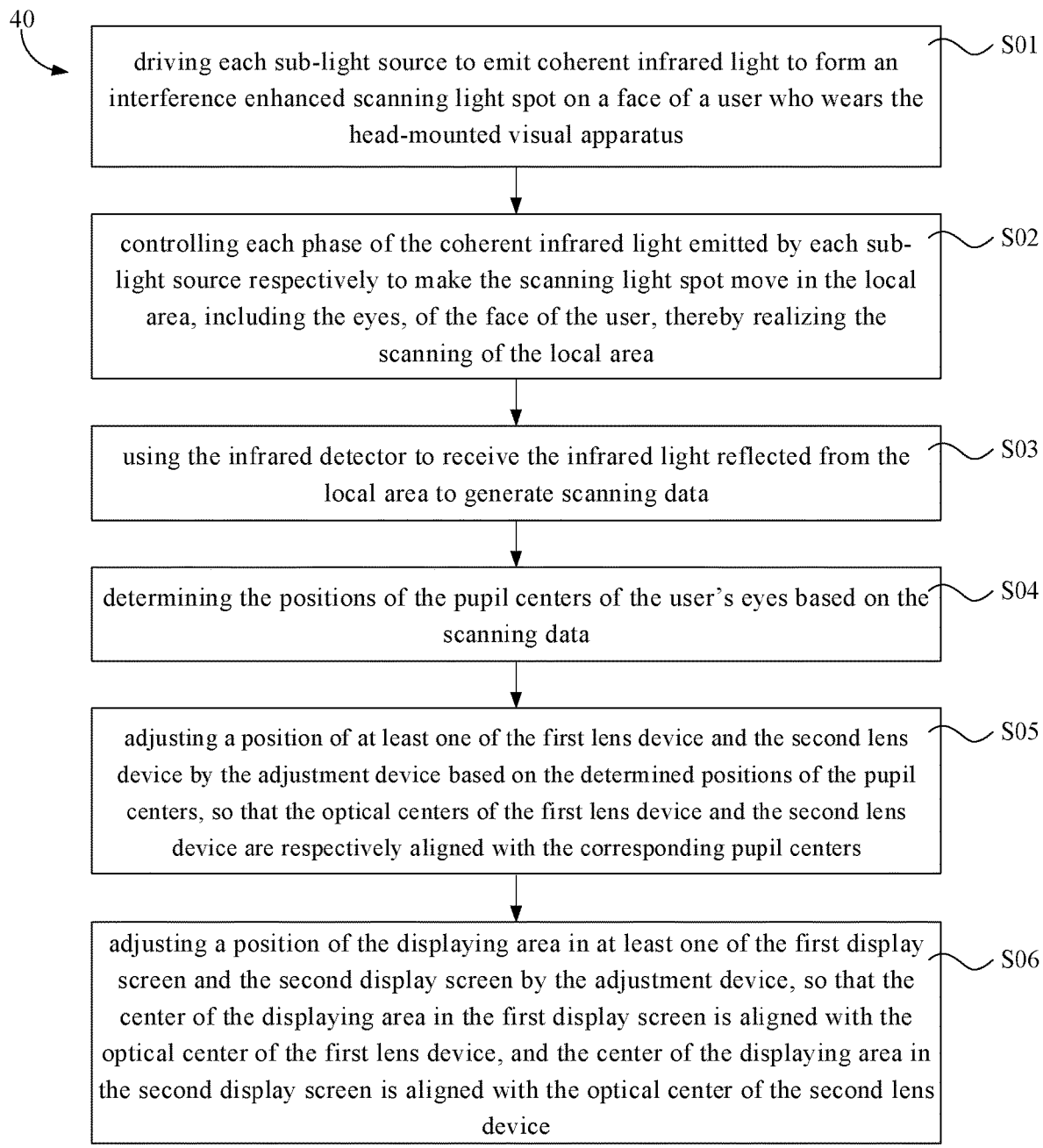
FIG. 7 schematically shows still another control method for a head-mounted visual apparatus provided by some exemplary embodiments in the form of a flowchart.

FIG. 7 schematically shows still another control method for a head-mounted visual apparatus provided by some exemplary embodiments in the form of a flowchart, wherein the head-mounted visual apparatus further comprises a first display screen and a second display screen. The first and second display screens each provide a display image so that one eye of the user may see an image displayed in the displaying area of the first display screen through the first lens device, and the other eye may see an image displayed in the displaying area of the second display screen through the second lens device. Furthermore, the adjustment device of the head-mounted visual apparatus may further be configured to adjust the positions of the displaying areas in the first display screen and the second display screen. In comparison with the control method 30 for the head-mounted visual apparatus as shown in FIG. 6, the control method 40 for the head-mounted visual apparatus as shown in FIG. 7 is different because it also comprises the step S06, i.e., adjusting the position of the displaying area in at least one of the first display screen and the second display screen by the adjustment device, so that the center of the displaying area in the first display screen is aligned with the optical center of the first lens device, and the center of the displaying area in the second display screen is aligned with the optical center of the second lens device. As a non-limiting example, the adjustment in the step S06 may be realized by the following operation: adjusting the spatial positions of the first and second display screens correspondingly, and/or turning on or off the pixels of the first and second display screens correspondingly, so as to adjust the positions of the displaying areas in the first and second display screens is with respect to the display screens. It should be understood that turning off some of the pixels of the display screen may also reduce the power consumption of the head-mounted visual apparatus. In addition, it shall also be noted that when the head-mounted visual apparatus comprises the first display screen and the second display screen, the control method 40 may also, as required, adjust the distance (i.e., the object distance) between the optical center of the lens device and the center of the displaying area in the corresponding display screen, so as to ensure that the image displayed in the displaying area of the display screen may be clearly imaged in the user's eye via the lens device.

It should be understood that the control methods 10, 20, 30, 40 for the head-mounted visual apparatus provided by the exemplary embodiments may be executed at a predetermined time (for example, when the user just wears the head-mounted visual apparatus) during the use of the head-mounted visual apparatus, so as to measure the positions of the pupil centers of the user's eyes and adjust the head-mounted visual apparatus accordingly. The control methods 10, 20, 30 and 40 may also be repeatedly executed during the use of the head-mounted visual apparatus, so as to monitor the positions of the pupil centers of the user's eyes in real time and adjust the head-mounted visual apparatus in real time; or the control methods 10, 20, 30 and 40 may also be executed randomly in response to the user's operation (for example, through a button or other I/O device) so as to measure the positions of the pupil centers of the user's eyes and adjust the head-mounted visual apparatus accordingly.

Figure 8:
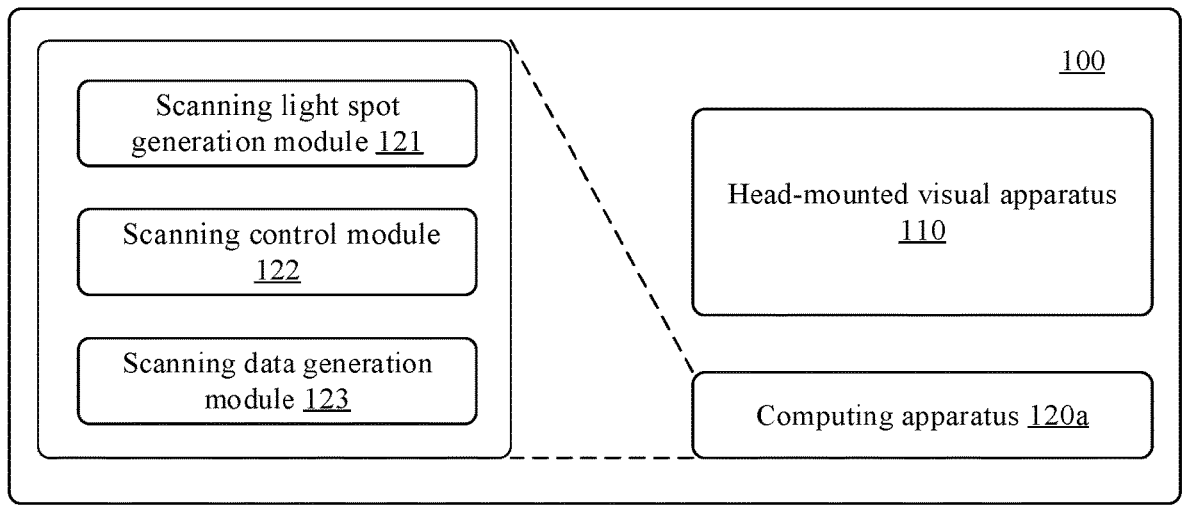
FIG. 8 schematically shows a head-mounted visual system provided by some exemplary embodiments in the form of a block diagram.

FIG. 8 schematically shows a head-mounted visual system provided by some exemplary embodiments in the form of a block diagram.

As shown in FIG. 8, the head-mounted visual system 100 may comprise a head-mounted visual apparatus 110 and a computing apparatus 120a. The head-mounted visual apparatus 110 may have any suitable product form known in the prior art, including but not limited to: a mobile-end head-mounted display, an external head-mounted apparatus and is a VR all-in-one machine. The mobile-end head-mounted display may be a VR glasses box, which may be used by the user to watch after putting it into a mobile phone; the external head-mounted apparatus is also called a PC (personal computer)-end head-mounted display, which may be used by the user to watch after connecting it to a computer; the VR all-in-one machine has an independent CPU (central processing unit), and input and output display functions, which may completely eliminate the need for an external device. The head-mounted visual apparatus 110 comprises the infrared transceiver 12 described previously with respect to FIG. 2. The computing apparatus 120a may be implemented as a program application pre-installed in the head-mounted visual apparatus 110 or downloaded via a network such as the Internet. Alternatively, the computing apparatus 120a may also be implemented as a separate apparatus working with the head-mounted visual apparatus 110 or a hardware assembly integrated in the head-mounted visual apparatus 110, which will not be particularly specified in the present disclosure. The computing apparatus 120a may be configured to implement a control method as shown in FIGS. 1, 3, 4, 5, 6, and 7.

As shown in FIG. 8, the computing apparatus 120a may comprise a scanning light spot generation module 121, a scanning control module 122 and a scanning data generation module 123. The scanning light spot generation module 121 may be configured to drive each sub-light source to emit coherent infrared light to form an interference enhanced scanning light spot on the face of a user who wears a head-mounted visual apparatus. The scanning control module 122 may be configured to control each phase of the coherent infrared light emitted by each sub-light source respectively to to make the scanning light spot move in the local area, including the eyes, of the user's face, thereby realizing the scanning of the local area. The scanning data generation module 123 may be configured to use the infrared detector to receive the infrared light reflected from the local area to generate scanning data. Therefore, it should be understood that the is scanning light spot generation module 121, the scanning control module 122 and the scanning data generation module 123 in the computing apparatus 120a may be used to perform the steps S01, S02 and S03 in the control methods 10, 20, 30 and 40, respectively.

Figure 9:
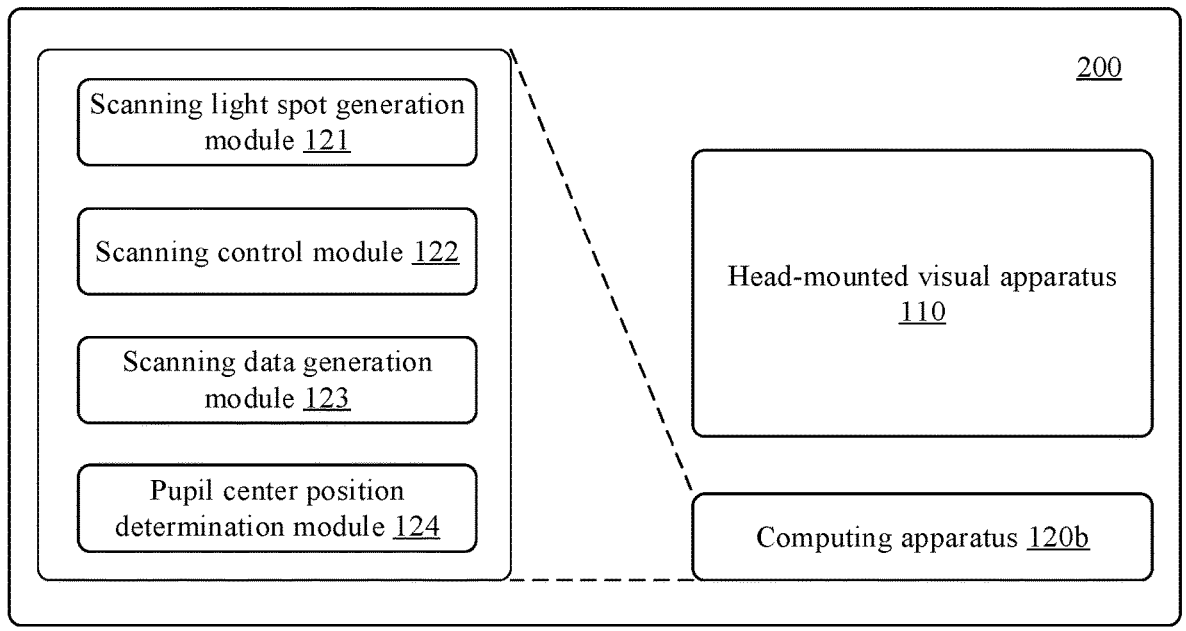
FIG. 9 schematically shows another head-mounted visual system provided by some exemplary embodiments in the form of a block diagram.

FIG. 9 schematically shows another head-mounted visual system provided by some exemplary embodiments in the form of a block diagram. In comparison with the head-mounted visual system 100 as shown in FIG. 8, the head-mounted visual system 200 as shown in FIG. 9 is different because the computing apparatus 120b further comprises a pupil center position determination module 124, in addition to those modules as shown in FIG. 8. The pupil center position determination module 124 may be configured to determine the positions of the pupil centers of the user's eyes based on the scanning data. Therefore, it should be understood that the pupil center position determination module 124 included in the computing apparatus 120b may be used to perform the step S04 in the control methods 20, 30, 40.

Figure 10:
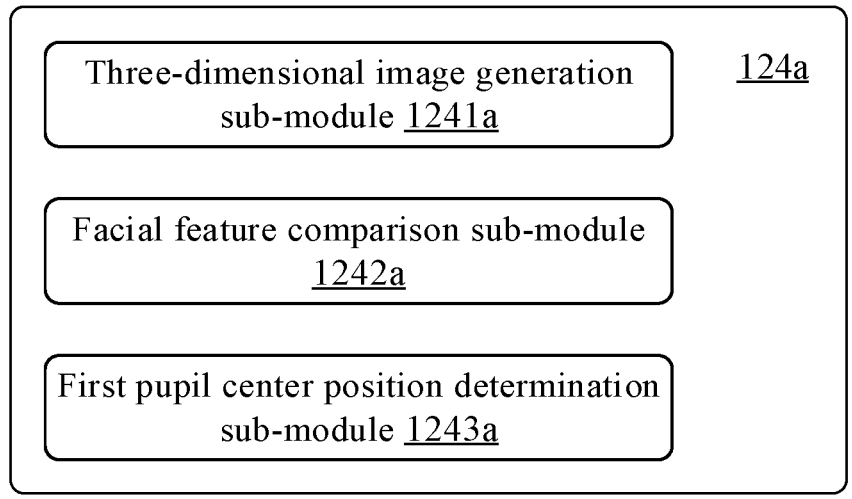
FIG. 10 schematically shows an example of a pupil center position determination module of a computing apparatus in the head-mounted visual system as shown in FIG. 9.

FIG. 10 schematically shows an example of a pupil center position determination module of a computing apparatus 120b in the head-mounted visual system 200 as shown in FIG. 9. As shown in FIG. 10, the pupil center position determination module 124a may comprise: a three-dimensional image generation sub-module 1241a, a facial feature comparison sub-module 1242a and a first pupil center position determination sub-module 1243a. The three-dimensional image generation sub-module 1241a may be configured to generate the three-dimensional image of the local area based on the scanning data. The facial feature comparison sub-module 1242a may be configured to compare the three-dimensional image with the facial features to determine the positions of the eyes. The first pupil center position determination sub-module 1243a may be configured to determine the positions of the pupil centers based on the positions of the eyes. Therefore, it should be understood that the three-dimensional image generation sub-module 1241a, the facial feature is comparison sub-module 1242a and the first pupil center position determination sub-module 1243a may be used to perform the steps S041a, S042a and S043a of the control method as shown in FIG. 4, respectively.

It shall be understood that the three-dimensional image generation sub-module 1241a may determine the distance between each point in the local area and the infrared detector 14 by any suitable method, including but not limited to the phase ranging method, the trigonometric ranging method, etc., so that the depth information of each point in the local area (i.e., the change of the distance between each part of the local area and a reference plane of the head-mounted visual apparatus, e.g., the plane where the infrared detector 14 is located (which is substantially parallel to the user's face)) may be obtained. In an exemplary embodiment using the trigonometric ranging method, the infrared detector 14 may comprise a plurality of sub-detectors that form a detector array. Depending on the distance between each part of the local area of the user's face and, e.g., the infrared detector 14, the infrared light reflected back to the infrared detector 14 will be distributed on different sub-detectors of the detector array. Therefore, according to the distribution of the reflected infrared light on the detector array, the depth information of each point of the local area can be determined and is recorded in the scanning data accordingly. The three-dimensional image generation sub-module 1241a may generate a three-dimensional image of the local area according to the scanning coordinates of each point in the local area and the corresponding depth information of each point recorded in the scanning data. It shall be understood that the facial feature comparison sub-module 1242a may determine the positions of the eyes based on the comparison with any to suitable facial features. As a non-limiting example, it may identify the graphical features of the eye corners (including the inner and outer eye corners) in the three-dimensional image of the local area, and determine the positions of the user's eyes based on the identified graphical features of the eye corners. The first pupil center position determination sub-module 1243a may determine the positions of the pupil centers of the eyes based on the determined positions of the user's eyes. As a non-limiting example, after identifying the graphical features of the eye corners, the first pupil center position determination sub-module 1243a may determine the middle position between the two corresponding eye corners (i.e., the inner and outer eye corners) as the position of the pupil center.

Figure 11:
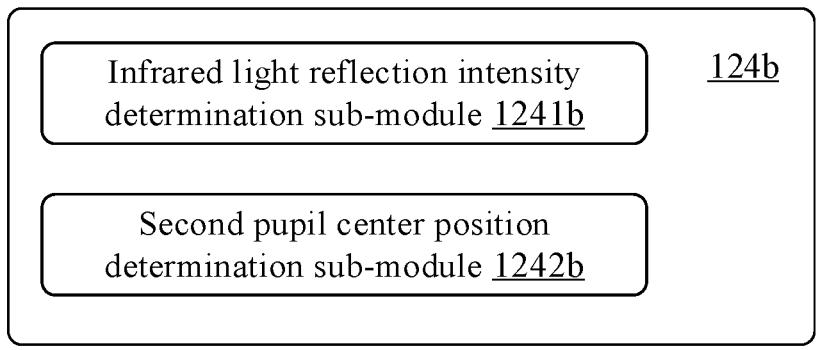
FIG. 11 schematically shows another example of a pupil center position determination module of a computing apparatus in the head-mounted visual system as shown in FIG. 9.

FIG. 11 schematically shows another example of a pupil center position determination module of a computing apparatus 120b in the head-mounted visual system 200 as shown in FIG. 9. As shown in FIG. 11, the pupil center position determination module 124b may comprise an infrared light reflection intensity determination sub-module 1241b and a second pupil center position determination sub-module 1242b. The infrared light reflection intensity determination sub-module 1241b may be configured to determine the infrared light reflection intensity of each part of the local area based on the scanning data. The second pupil center position determination sub-module 1242b may be configured to determine the positions of the pupil centers based on the infrared light reflection intensity of each part of the local area. Thus, it shall be understood that the infrared light reflection intensity determination sub-module 1241b and the second pupil center position determination sub-module 1242b may be respectively used to execute the steps S041b and S042b of the control method as shown in FIG. 5.

The term "module" as used in the present disclosure generally refers to software, firmware, hardware or combinations thereof, and the technical features thereof are irrelevant to a platform, which means that these technical features may be implemented on various computing platforms iii which have various processors. More generally, various techniques may be described herein in the general context of software and hardware elements or program modules. The various modules described above with respect to FIGS. 8, 9, 10, and 11 may be implemented in hardware or in hardware incorporating software and/or firmware. For example, these modules may is be implemented as computer program codes/instructions configured to be executed in one or more processors and stored in a computer-readable storage medium. Alternatively, these modules can be implemented as hardware logic/circuits. For example, in an exemplary embodiment, one or more of the scanning light spot generation module 121, the scanning control module 122, the scanning data generation module 123, the pupil center position determination module 124, the three-dimensional image generation sub-module 1241a, the facial feature comparison sub-module 1242a, the first pupil center position determination sub-module 1243a, the infrared light reflection intensity determination sub-module 1241b and the second pupil center position determination sub-module 1242b may be implemented together in the SoC. The SoC may comprise an integrated circuit chip (which comprises a processor (e.g., a central processing unit (CPU), a microcontroller, a microprocessor, a digital signal processor (DSP), etc.), a memory, one or more communication interfaces, and/or one or more components of other circuit), and may optionally execute the received program code and/or comprise embedded firmware for function execution. In addition, the features of the techniques described in the present disclosure are irrelevant to a platform, which means that these techniques may be implemented on various computing platforms which have various processors.

Figure 12:
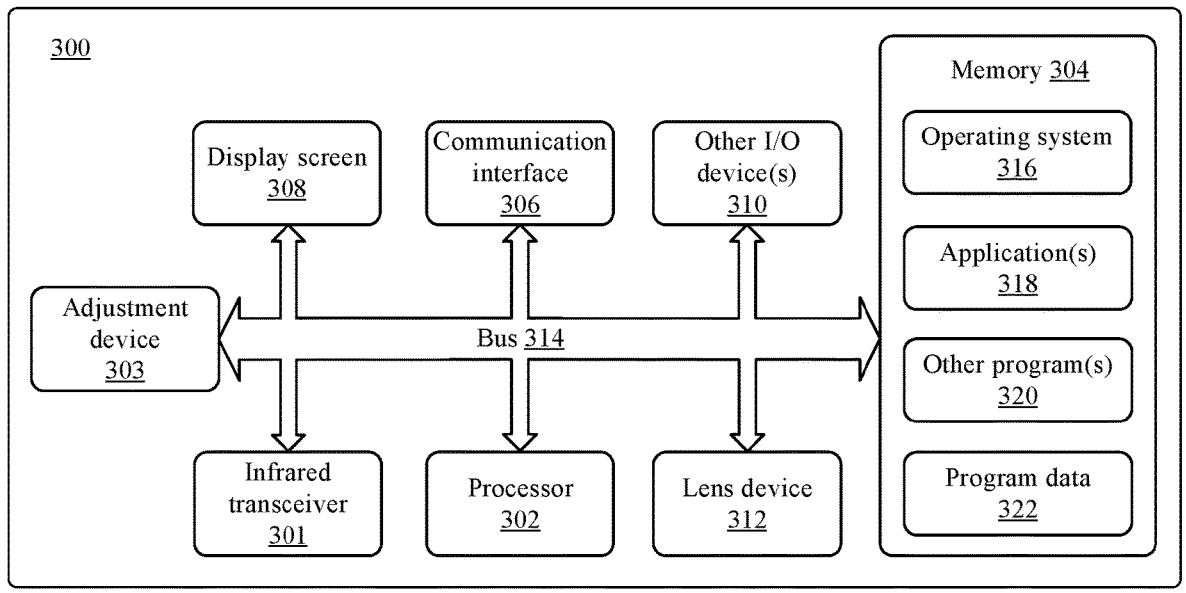
FIG. 12 schematically shows a head-mounted visual apparatus provided by some exemplary embodiments in the form of a block diagram.

FIG. 12 schematically shows a head-mounted visual apparatus provided by some exemplary embodiments in the form of a block diagram. As a non-limiting example, the head-mounted visual apparatus 110 as shown in FIGS. 8 and 9 may be in the form of the head-mounted visual apparatus 300. Similar to the contents described above, the head-mounted to visual apparatus 300 may also have any suitable product form known in the prior art, including but not limited to: a mobile-end head-mounted display, an external head-mounted apparatus and a VR all-in-one machine, which will not be particularly specified in the present disclosure.

As shown in FIG. 12, the head-mounted visual apparatus 300 may is comprise an infrared transceiver 301, at least one processor 302, an adjustment device 303, a memory 304, one or more communication interfaces 306, a display 308, other input/output (I/O) device(s) 310, and a lens device 312, which are in mutual communication via, e.g., a system bus 314 or other suitable connection.

Figure 13:
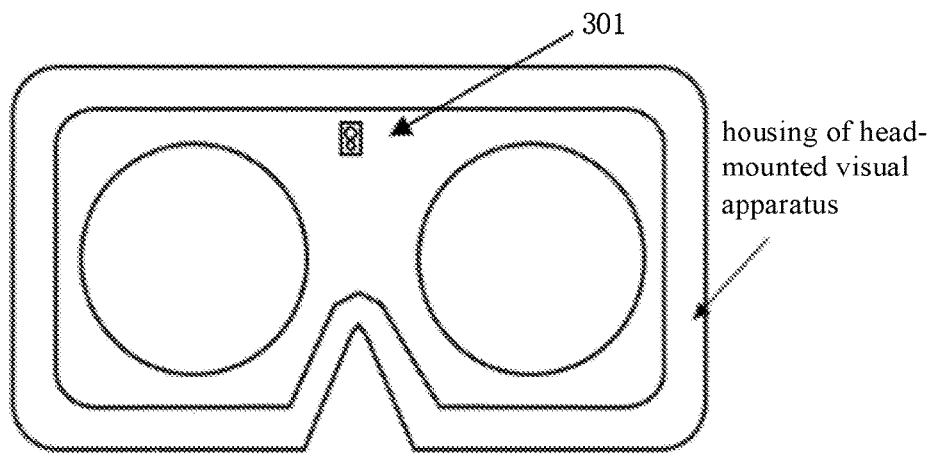
FIG. 13 schematically shows an infrared transceiver installed in the head-mounted visual apparatus.

It shall be understood that the infrared transceiver 301 may be in the form of the infrared transceiver 20 described previously with respect to FIG. 2. Referring to FIG. 13, it schematically shows an infrared transceiver 301 mounted in a housing of the head-mounted visual apparatus 300. However, it should be understood that the infrared transceiver 301 may be installed in any suitable place of the head-mounted visual apparatus 300 as long as it can transmit coherent infrared light to the face of the user who wears the head-mounted visual apparatus 300 and can receive the infrared light reflected from the face.

With further reference to FIG. 12, the lens device 312 may comprise, for example, a first lens device and a second lens device to correspond to the left eye and the right eye of the user, respectively. The first lens device and the second lens device may each include one or more lenses, or may also comprise any suitable other optical element, for imaging the image displayed on the display screen 308 in the user's eyes for viewing. It should be understood that the composition and imaging principle of the lens device 312 are known in the art, so the structure design known in the prior art may still be used. In addition, the lens device 312 may be any suitable lens device as long as it can image the image displayed on the display screen 308 in the user's eyes.

As a non-limiting example, the display screen 308 may be an LCD display (i.e., liquid crystal display) or an OLED display (i.e., organic light-emitting diode display), or any other suitable display device. The display screen 308 is used to display an image so that it can be imaged in the user's eyes through the lens device 312 to be viewed by the user. In the case that the lens device 312 comprises a first lens device and a second is lens device, the display screen 308 may correspondingly comprise a first display screen and a second display screen. The first display screen and the second display screen may correspond to the first lens device and the second lens device respectively. In addition, the specific structure of the display screen 308 is also known in the art, so the structure design known in the prior art may still be used.

The processor 302 may be a single processing unit or multiple processing units, and all processing units may comprise a single or multiple computing units or cores. The processor 302 may be implemented as one or more microprocessors, microcomputers, microcontrollers, digital signal processors, central processing units, state machines, logic circuits and/or any device that that manipulates one or more signals based on operating instructions. In addition to other capabilities, the processor 302 may be configured to acquire and execute a computer-readable instruction stored in a memory 304 or other computer-readable medium, such as a program code of an operating system 316, a program code of an application 318, a program code of other program 320, and may be configured to acquire program data 322 stored in the memory 304, so the processor 302 may implement control methods 10, 20, 30, 40 for the head-mounted visual apparatus as described above.

The memory 304 may be, for example, any suitable computer-readable storage medium for storing an instruction, wherein the instruction may be executed by the processor 302 in order to implement the various functions as described above. For example, the memory 304 may generally comprise both a volatile memory and a non-volatile memory (e.g., RAM, ROM). In addition, the memory 304 may also comprise a hard disk drive, a solid-state drive, a removable medium, an external and a removable drive, a memory card, a flash memory, a floppy disk, an optical disk (e.g., CD or DVD), a storage array, a network attached storage, a storage area network, and the like. The memory 304 may be referred to herein as a computer-readable storage medium, and may be a non-instantaneous medium capable of storing a computer-readable, processor-executable program instruction as a computer program code, which may be executed by the processor 302 as a specific machine configured to perform the operations and functions described in the exemplary embodiment.

A plurality of program modules may be stored in the memory 304. These program modules may comprise an operating system 316, one or more applications 318, other programs 320, and program data 322, and may be loaded into the memory 304 for execution. Examples of such an application or program module may comprise, for example, a computer program logic (e.g., a computer program code or instruction) for implementing the following components/functions: the scanning light spot generation module 121 configured to drive each sub-light source to emit coherent infrared light to form an interference enhanced scanning light spot on the face of a user who wears the head-mounted visual apparatus; the scanning control module 122 configured to control each phase of the coherent infrared light emitted by each sub-light source respectively to make the scanning light spot move in the local area, including the eyes, of the user's face, thereby realizing the scanning of the local area; the scanning data generation module 123 configured to use the infrared detector to receive the infrared light reflected from the local area to generate scanning data; the pupil center position determination module 124 configured to determine the position of the pupil centers of the user's eyes based on the scanning data; the three-dimensional image generation sub-module 1241a configured to generate the three-dimensional image of the local area based on the scanning data; the facial feature comparison sub-module 1242a configured to compare the three-dimensional image with the facial features to determine the positions of the eyes; the first pupil center position determination sub-module 1243a configured to determine the positions of the pupil centers based on the positions of the eyes; the infrared light reflection intensity determination sub-module 1241b configured to determine the infrared light reflection intensity of each part of the local area based on the scanning data; and the second pupil center position determination sub-module 1242b configured to determine the positions of the pupil centers based on the infrared light reflection intensity of each part of the local area.

Although illustrated in FIG. 12 as being stored in the memory 304 of the head-mounted visual apparatus 300, the modules 121, 122, 123, 124, 1241a, 1242a, 1243a, 1241b, 1242b, or portions thereof may also be implemented by using any form of the computer-readable medium accessible by the head-mounted visual apparatus 300. As used herein, "a computer-readable medium" at least comprises two types of computer-readable media, namely, a computer-readable storage medium and a communication medium.

A computer-readable storage medium comprises volatile and non-volatile, removable and non-removable medium implemented by any method or technology for storing information, such as a computer-readable instruction, a data structure, a program module, or other data. The computer-readable storage medium comprises, but is not limited to, a RAM, a ROM, an EEPROM, a flash memory or other memory technologies, a CD-ROM, a digital general-purpose disk (DVD), or other optical storage devices, a magnetic cartridge, a magnetic tape, a magnetic disk storage device or other magnetic storage devices, or any other non-transmission medium that may be used to store information for access by a computing apparatus.

In contrast, the communication medium may specifically implement a computer-readable instruction, a data structure, a program module or other data in a modulated data signal, such as a carrier or other transmission mechanism. The computer storage medium as defined in the present disclosure does not comprise a communication medium.

The head-mounted visual apparatus 300 may also comprise one or more communication interfaces 306 for exchanging data with other devices via, e.g., a network or direct connection, as discussed above. Such a communication interface may be one or more of the followings: any type of network interface (e.g., a network interface card (NIC)), a wired or wireless (such as IEEE 802.11 wireless LAN (WLAN)) interface, a global microwave access interoperability (Wi-MAX) interface, an Ethernet interface, a universal serial bus (USB) interface, a cellular network interface, a Bluetooth™ interface, a near field communication (NFC) interface, etc. The communication interface 306 may facilitate communication within a variety of networks and protocol types, including a wired (such as LAN, or cable) network and a wireless (such as WLAN, cellular, satellite, etc.) network, Internet, and the like. The communication interface 306 may also provide communication with an external storage device (not shown), such as a storage array, a network attached storage, a storage area network, etc.

Other I/O device(s) 310 in the head-mounted visual apparatus 300 may be one or more devices that receive various inputs from a user and provide various outputs to the user, and may comprise a touch input device, a gesture input device, a shooting device, a keyboard, a remote control, a mouse, a printer, an audio input/output device, and the like.

The adjustment device 303 may adjust the position of the lens device 312 based on the determined positions of the pupil centers of the user's eyes. For example, when the lens device 312 comprises a first lens device and a second lens device, the adjustment device 303 may adjust the positions of the first lens device and the second lens device based on the determined positions of the optical centers of the pupil centers of the user's eyes, so that the optical centers of the first lens device and the second lens device are respectively aligned with the corresponding pupil centers. In other exemplary embodiments, the adjustment device 303 may also adjust the position of a displaying area in the display screen 308. As a non-limiting example, when the display screen 308 comprises a first display screen and a second display screen, the adjustment device 303 may adjust the spatial position of at least one of the first display screen and the second display screen; and/or, adjust the position of the displaying area with respect to the corresponding display screen by turning on or off the corresponding pixels in at least one of the first display screen and the second display screen. Thus, the center of the displaying area in the first display screen may be aligned with the optical center of the first lens device, and the center of the displaying area in the second display screen may be aligned with the optical center of the second lens device. It should be understood that turning off some of the pixels of the display screen may also reduce the power consumption of the head-mounted visual apparatus. In addition, the adjustment device 303 may also adjust the distance (i.e., the image distance) between the first and second lens devices and the corresponding pupil centers, and/or adjust the distance (i.e., the object distance) between the first and second lens devices and the corresponding display screens. By adjusting the image distance and/or object distance, it can ensure that the image displayed in the display screen may be clearly imaged in the user's eye via the lens device. The specific structure of the adjustment device 303 can follow the structure design known in the prior art. As a non-limiting example, it is easy to understand that the adjustment device 303 may correspondingly comprise driver(s), gear(s), guide rail(s), switch element(s) and the like, as required.

By applying the control method, the head-mounted visual system and the head-mounted visual apparatus provided by the exemplary embodiments, at least the following beneficial effects may be achieved:

1) the scanning of the local area is realized by phase control, the complicated structure of the mechanical scanning device is avoided, and the response time required for scanning is reduced accordingly;

2) without using the high-resolution sensor of a camera, it is possible to scan the local area, including the eyes, of the user's face, obtain the depth information of the local area, and realize the three-dimensional reconstruction of the facial area; and 3) it can conveniently determine the positions of the pupil centers of the user's eyes, so as to match the optical center of the lens device of the apparatus with the pupil center of the user's eye, and improve the comfort and immersion of AR users.

The above described embodiments are only exemplary embodiments, but the scope of the present disclosure is not limited thereto. Any person skilled in the art can readily conceive of various variations or replacements within the technical scope disclosed by the present disclosure. These variations or replacements all fall within the scope of protection of the present disclosure. Thus, the scope of protection of the present disclosure is determined based upon the scopes of the appended claims.

What is claimed is:

1. A control method for a head-mounted visual apparatus, wherein the head-mounted visual apparatus comprises an infrared transceiver, the infrared transceiver comprises an infrared light source array and an infrared detector, the infrared light source array comprises a plurality of sub-light sources, the plurality of sub-light sources are arranged to form multiple rows and multiple columns of the infrared light source array, each of the plurality of sub-light sources is configured to emit coherent infrared light, and the control method comprises steps of:
    driving each sub-light source to emit coherent infrared light to form an interference enhanced scanning light spot on a face of a user who wears the head-mounted visual apparatus;
    establishing a two-dimensional rectangular reference coordinate system in a field of vision of the infrared detector, wherein the two-dimensional rectangular reference coordinate system comprises a first axis and a second axis that are perpendicular to each other;
    controlling each phase of the coherent infrared light emitted by each sub-light source respectively to make the scanning light spot move according to the two-dimensional rectangular reference coordinate system to scan each line extending along the first axis point by point and scan all lines along the second axis sequentially, thereby realizing a two-dimensional scanning of a local area, including eyes, of the face of the user; and
    using the infrared detector to receive the infrared light reflected from the local area to generate scanning data.

2. The control method according to claim 1, wherein the control method further comprises a step of:
    determining positions of the pupil centers of the user's eyes based on the scanning data.

3. The control method according to claim 2, wherein the step of determining the positions of the pupil centers of the user's eyes based on the scanning data comprises:
    generating a three-dimensional image of the local area based on the scanning data;
    comparing the three-dimensional image with facial features to determine the positions of the eyes; and
    determining the positions of the pupil centers based on the positions of the eyes.

4. The control method according to claim 3, wherein the infrared detector comprises a detector array composed of a plurality of sub-detectors, the scanning data records a distribution on the detector array of the infrared light reflected from the local area, and the step of generating a three-dimensional image of the local area based on the scanning data comprises:
    obtaining depth information of each part of the local area based on the distribution; and
    generating the three-dimensional image based on the depth information of each part of the local area.

5. The control method according to claim 3, wherein the step of comparing the three-dimensional image with facial features to determine the positions of the eyes comprises:
    identifying graphic features of eye corners in the three-dimensional image; and
    determining the positions of the eyes based on the identified graphic features of the eye corners.

6. The control method according to claim 2, wherein the step of determining positions of the pupil centers of the user's eyes based on the scanning data comprises:
    determining an infrared light reflection intensity of each part of the local area based on the scanning data; and
    determining the positions of the pupil centers based on the infrared light reflection intensity of each part of the local area.

7. The control method according to claim 2, wherein the head-mounted visual apparatus further comprises a first lens device and a second lens device configured to correspond to the user's eyes so that the user may watch via the first lens device and the second lens device, and the head-mounted visual apparatus further comprises an adjustment device configured to adjust positions of the first lens device and the second lens device, and the control method further comprises a step of:
    adjusting a position of at least one of the first lens device and the second lens device by the adjustment device based on the positions of the pupil centers, so that the optical centers of the first lens device and the second lens device are respectively aligned with the corresponding pupil centers.

8. The control method according to claim 7, wherein the control method further comprises:
    adjusting a distance from an optical center of at least one of the first lens device and the second lens device to one of the pupil centers correspondingly.

9. The control method according to claim 7, wherein the head-mounted visual apparatus further comprises a first display screen and a second display screen, the adjustment device is further configured to adjust positions of displaying areas in the first display screen and the second display screen, and the control method further comprises:
    adjusting a position of a displaying area in at least one of the first display screen and the second display screen by the adjustment device, so that the center of the displaying area in the first display screen is aligned with the optical center of the first lens device, and the center of the displaying area in the second display screen is aligned with the optical center of the second lens device.

10. The control method according to claim 9, wherein the control method further comprises:
    adjusting a distance from the center of the displaying area in at least one of the first display screen and the second display screen to the optical center of one of the first lens device and the second lens device correspondingly.

11. A head-mounted visual apparatus comprising:
    an infrared transceiver comprising an infrared light source array and an infrared detector, wherein the infrared light source array comprising a plurality of sub-light sources, the plurality of sub-light sources are arranged to form multiple rows and multiple columns of the infrared light source array, each of the plurality of sub-light sources is configured to emit coherent infrared light;
    a memory configured to store a computer program; and
    a processor configured to execute the computer program to realize a control method for the head-mounted visual apparatus, the control method comprising steps of:
        driving each sub-light source to emit coherent infrared light to form an interference enhanced scanning light spot on a face of a user who wears the head-mounted visual apparatus;
        establishing a two-dimensional rectangular reference coordinate system in a field of vision of the infrared detector, wherein the two-dimensional rectangular reference coordinate system comprises a first axis and a second axis that are perpendicular to each other;
        controlling each phase of the coherent infrared light emitted by each sub-light source respectively to make the scanning light spot move according to the two-dimensional rectangular reference coordinate system to scan each line extending along the first axis point by point and scan all lines along the second axis sequentially, thereby realizing a two-dimensional scanning of a local area, including eyes, of the face of the user; and using the infrared detector to receive the infrared light reflected from the local area to generate scanning data.

12. The head-mounted visual apparatus according to claim 11, wherein the control method further comprises a step of:
    determining positions of the pupil centers of the user's eyes based on the scanning data.

13. The head-mounted visual apparatus according to claim 12, wherein the step of determining the positions of the pupil centers of the user's eyes based on the scanning data in the control method comprises:
    generating a three-dimensional image of the local area based on the scanning data;
    comparing the three-dimensional image with facial features to determine the positions of the eyes; and
    determining the positions of the pupil centers based on the positions of the eyes.

14. The head-mounted visual apparatus according to claim 13, wherein the infrared detector comprises a detector array composed of a plurality of sub-detectors, the scanning data records a distribution on the detector array of the infrared light reflected from the local area, and wherein the step of generating a three-dimensional image of the local area based on the scanning data comprises:
    obtaining depth information of each part of the local area based on the distribution; and
    generating the three-dimensional image based on the depth information of each part of the local area.

15. The head-mounted visual apparatus according to claim 13, wherein the step of comparing the three-dimensional image with facial features to determine the positions of the eyes comprises:
    identifying graphic features of eye corners in the three-dimensional image; and
    determining the positions of the eyes based on the identified graphic features of the eye corners.

16. The head-mounted visual apparatus according to claim 12, wherein the step of determining positions of the pupil centers of the user's eyes based on the scanning data comprises:
    determining an infrared light reflection intensity of each part of the local area based on the scanning data; and
    determining the positions of the pupil centers based on the infrared light reflection intensity of each part of the local area.

17. The head-mounted visual apparatus according to claim 12, wherein the head-mounted visual apparatus further comprises a first lens device and a second lens device configured to correspond to the user's eyes so that the user may watch via the first lens device and the second lens device, and the head-mounted visual apparatus further comprises an adjustment device configured to adjust positions of the first lens device and the second lens device, and the control method further comprises a step of:
    adjusting a position of at least one of the first lens device and the second lens device by the adjustment device based on the positions of the pupil centers, so that the optical centers of the first lens device and the second lens device are respectively aligned with the corresponding pupil centers.

18. The head-mounted visual apparatus according to claim 17, wherein the head-mounted visual apparatus further comprises a first display screen and a second display screen, the adjustment device is further configured to adjust positions of displaying areas in the first display screen and the second display screen, and the control method further comprises:
    adjusting a position of a displaying area in at least one of the first display screen and the second display screen by the adjustment device, so that the center of the displaying area in the first display screen is aligned with the optical center of the first lens device, and the center of the displaying area in the second display screen is aligned with the optical center of the second lens device.

19. The head-mounted visual apparatus according to claim 18, wherein the control method further comprises:
    adjusting a distance from the center of the displaying area in at least one of the first display screen and the second display screen to the optical center of one of the first lens device and the second lens device correspondingly.

20. A computer-readable storage medium in which a computer program is stored, and when the computer program is executed, a control method for a head-mounted visual apparatus is realized, wherein the head-mounted visual apparatus comprises an infrared transceiver, the infrared transceiver comprises an infrared light source array and an infrared detector, the infrared light source array comprises a plurality of sub-light sources, the plurality of sub-light sources are arranged to form multiple rows and multiple columns of the infrared light source array, each of the plurality of sub-light sources is configured to emit coherent infrared light, and the control method comprises steps of:
    driving each sub-light source to emit coherent infrared light to form an interference enhanced scanning light spot on a face of a user who wears the head-mounted visual apparatus;
    establishing a two-dimensional rectangular reference coordinate system in a field of vision of the infrared detector, wherein the two-dimensional rectangular reference coordinate system comprises a first axis and a second axis that are perpendicular to each other;
    controlling each phase of the coherent infrared light emitted by each sub-light source respectively to make the scanning light spot move according to the two-dimensional rectangular reference coordinate system to scan each line extending along the first axis point by point and scan all lines along the second axis sequentially, thereby realizing a two-dimensional scanning of a local area, including eyes, of the face of the user; and
    using the infrared detector to receive the infrared light reflected from the local area to generate scanning data.

* * * * *